UNITED STATES PATENT OFFICE.

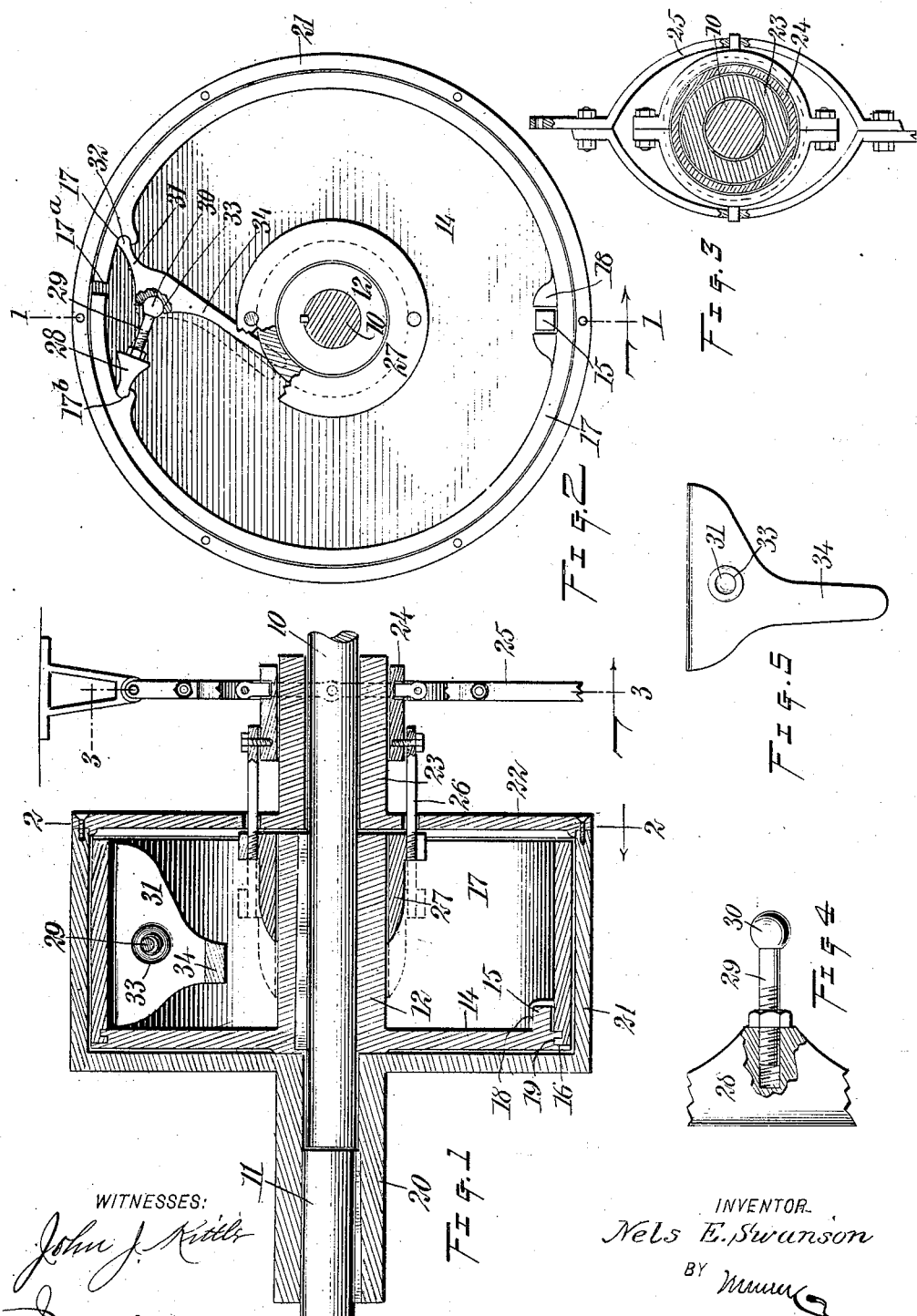

NELS E. SWANSON, OF YORK, NEBRASKA.

CLUTCH.

No. 819,469.   Specification of Letters Patent.   Patented May 1, 1906.

Application filed September 11, 1905. Serial No. 278,045.

*To all whom it may concern:*

Be it known that I, NELS E. SWANSON, a citizen of the United States, and a resident of York, in the county of York and State of Nebraska, have invented a new and Improved Clutch, of which the following is a full, clear, and exact description.

The invention relates to a friction-clutch of that class in which a ring is expanded or contracted against a shell or drum to fasten the two members together; and it consists in various improvements in the construction and assemblage of the device, among which may be enumerated the arrangement of the shell with the band and its carrier and the devices for acting on the band to expand it.

Reference is to be had to the accompanying drawings, forming a part of this specification, in which similar characters of reference indicate corresponding parts in all the figures.

Figure 1 is a longitudinal section on the line 1 1 of Fig. 2. Fig. 2 is a sectional elevation on the line 2 2 of Fig. 1. Fig. 3 is a section on the line 3 3 of Fig. 1. Fig. 4 is a detail of one of the toggle-links for expanding the ring, and Fig. 5 is a detail of the other toggle-link.

The clutch is here shown as applied to two shafts driving one from the other, and in Fig. 1, 10 may be taken to represent the continuously-rotating shaft, and 11 the shaft driven therefrom at will. To the shaft 10 is keyed a hub 12, having at one end a web 14, provided with a lateral ear 15 near its periphery and a peripheral groove 16.

17 indicates the clutch-band, which has two lugs 18 adapted to receive the ear 16 between them. On the inner side of the ring is formed an annular rib 19, adapted to be loosely received in the groove 16, as shown in Fig. 1. In this manner the band 17 rotates with the parts 14, 12, and 10, is held incapable of movement axially of the shaft, and is free to expand or contract, for which purpose the band is split at the point 17ª opposite ear 15 and lugs 18. (See Fig. 2.)

To the shaft 11 is keyed a hub 20, carrying a cylindric shell or drum having a removable end wall 22, which carries a sleeve 23, loosely inclosing the shaft 10. Loose on the sleeve 23 is a collar 24, adapted to be operated by a lever 25 of any suitable form. This collar 24 is joined by links 26 to a cone 27, which slides freely on the hub and is encircled by the band 17. The cone 27 is adapted to operate the toggle for expanding the clutch-ring. One link of the toggle, as shown in Fig. 4, is composed of a knife-edge member 28, having a stud 29 adjustable therein, the stud terminating in a ball 30. The other link 31 of the toggle has a knife-edge 32 at one end and a socket 33 at the other, the socket receiving the ball 30. Projecting from said second end of the link 31 is a tail 34. The knife-edges 28 and 32 are received, respectively, in pockets 17ᵇ, formed in the end portions of the band 17, and the tail 34 of the link 31 lies against the hub 12 in position to be engaged by the cone 27. To allow easy rolling of the parts, the knife-edges 28 and 32 are formed rounding, and the pockets 17ᵇ are correspondingly shaped. Taking the shaft 10 as a continuously-rotating element, the parts 12, 14, 17, 28, and 31 will, it may be seen, rotate with the shaft, while the shaft 11 and the parts 20, 21, 22, 23, 24, and 27 are normally stationary. Upon swinging the lever 25 so as to move the cone 27 to the position indicated by broken lines in Fig. 1 the cone will engage the tail 34 of the link 31 and rock the links, as per the dotted lines in Fig. 2. The toggle action thus exerted on the band expands the same, causing it to clamp against the inner side of the drum and fixing together the two parts of the clutch. Upon returning the lever 25 to its first position the cone will be withdrawn and the band will disengage the drum. In connection with this operation it will be seen that the toggle exercises a great leverage on the band and gives the clutch great power. It will also appear that the shell or drum 21 completely incloses the normally rotating parts and makes the clutch compact and safe, as well as furnishing a receptacle or case in which oil may be placed to lubricate the running parts.

Having thus described my invention, I claim as new and desire to secure by Letters Patent—

1. In a clutch, the combination of a shell or hollow drum adapted to be attached to one member, a web located in the drum and adapted to be attached to the other member, said web having an annular groove, an expansion-band having an annular rib fitting loosely in the groove, and means in the drum for operating the band.

2. In a clutch, the combination of a rotary drum, a rotary split band coacting therewith, a toggle lying in the plane of rotation of the band to operate the same, one link of the toggle having a tail extending toward the axis of rotation of the band, and means for operating the toggle through the medium of the tail.

3. In a clutch, the combination of a rotary drum, a rotary split band coacting therewith, a toggle lying in the plane of rotation of the band to operate the same, one link of the toggle having a tail extending toward the axis of rotation of the band, and means for operating the toggle through the medium of the tail, including a tapering operating member movable along the axis of rotation of the band.

4. In a clutch, the combination of a rotary drum, a rotary split band coacting therewith, and having pockets in its end portions, a toggle-link engaged in one pocket and having a ball at its end, a second toggle-link engaged in the other pocket and having a socket receiving the said ball, the second link having a tail projecting toward the axis of rotation of the band, and means for operating the toggle-links through the medium of the tail.

5. In a clutch, the combination of a hollow rotary drum, a hub arranged loosely therein, the drum and hub being adapted to be connected respectively with the parts to be connected by the clutch, a web attached to the hub within the drum, a split band carried by the web and loosely engaged with the periphery thereof, a toggle connected to the band to operate the same, a cone loosely mounted on the hub and rotating with the drum, and a member located outside of the drum and rotating therewith, said member being connected with the cone to permit moving the cone to operate the toggle.

In testimony whereof I have signed my name to this specification in the presence of two subscribing witnesses.

NELS E. SWANSON.

Witnesses:
GEO. F. DARWIN,
CARL ERICKSON.